US008125967B1

(12) United States Patent
Talley et al.

(10) Patent No.: US 8,125,967 B1
(45) Date of Patent: Feb. 28, 2012

(54) PRIORITIZED EV-DO PAGING BASED ON TYPE OF PACKET FLOW

(75) Inventors: Ryan S. Talley, Overland Park, KS (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 778 days.

(21) Appl. No.: 11/558,691

(22) Filed: Nov. 10, 2006

(51) Int. Cl.
*H04L 12/54* (2006.01)

(52) U.S. Cl. .................................. 370/338; 370/429

(58) Field of Classification Search .............. 370/445, 370/401, 389, 462, 230, 395.42, 444, 455, 370/338, 329, 429, 395.21; 455/435.3, 552.1, 455/522; 379/208.01; 709/207

See application file for complete search history.

(56) References Cited

U.S. PATENT DOCUMENTS

| | | | |
|---|---|---|---|
| 5,757,771 A | 5/1998 | Li et al. | |
| 5,828,835 A | 10/1998 | Isfeld et al. | 709/220 |
| 6,064,677 A | 5/2000 | Kappler et al. | 370/395.43 |
| 6,205,118 B1 | 3/2001 | Rathnavelu | 370/229 |
| 6,480,911 B1 | 11/2002 | Lu | 710/54 |
| 6,658,007 B1 | 12/2003 | Pasternak et al. | 370/395.4 |
| 6,724,721 B1 | 4/2004 | Cheriton | 370/229 |
| 6,810,426 B2 | 10/2004 | Mysore et al. | 709/234 |
| 6,876,952 B1 | 4/2005 | Kappler et al. | 702/187 |
| 7,474,642 B1* | 1/2009 | Chheda | 370/329 |
| 2002/0136230 A1* | 9/2002 | Dell et al. | 370/416 |
| 2003/0076804 A1* | 4/2003 | Sivalingham | 370/338 |
| 2006/0146721 A1 | 7/2006 | Attar et al. | |
| 2006/0270447 A1* | 11/2006 | Everson et al. | 455/552.1 |
| 2007/0116243 A1* | 5/2007 | Ahn | 379/310 |
| 2008/0126641 A1 | 5/2008 | Irish et al. | |

OTHER PUBLICATIONS

U.S. Appl. No. 12/201,634, entitled "Aging EV-DO Pages in a Queue Based on Latency Sensitivity," filed Aug. 29, 2008 in the name of Wurtenberger et al.
"The World is Watching PacketVideo—Wireless Media—Technology," http://www.packetvideo.com/prodtech/tech.asp (2 pages) printed from the World Wide Web on Oct. 25, 2002.
Surprise 2000, Network Management & Quality of Service (QoS) over the Internet, "Introduction: What is Quality of Service?" http://www.iis.ee.ic.ac.uk/~frank/surp00/article1/goap98/ (6 pages) printed from the World Wide Web on Mar. 14, 2003.
Bellavista et al., "An Active Middleware to Control QoS Level of Multimedia Services," http://arch1.cs.ccu.edu.tw/~wry89/1105/an-active-middleware-to.pdf (8 pages) printed from the World Wide Web on Oct. 25, 2002.

(Continued)

*Primary Examiner* — George Eng
*Assistant Examiner* — Nizar Sivji (57) ABSTRACT

Methods and systems are provided for prioritized EV-DO paging based on type of packet flow. In an embodiment, an access node provides service to a plurality of access terminals in a wireless coverage area. The access node receives data addressed to a particular access terminal, where the data is associated with a packet flow such as a VoIP call. The access node determines that the access terminal does not have a traffic channel, and responsively generates a page for transmission to the access terminal, where the page is associated with the packet flow. The access node determines whether the packet flow is latency-sensitive or rather is latency-tolerant. If the packet flow is latency-sensitive, the access node responsively prioritizes the page over one or more pages respectively associated with one or more latency-tolerant packet flows, where the prioritizing is with respect to order of transmission in the wireless coverage area.

12 Claims, 4 Drawing Sheets

OTHER PUBLICATIONS

Swinburne Information Technology Services—Networks, "Quality of Service (QOS)," http://www.networks.swin.edu.au/services/qos/ (5 pages) printed from the World Wide Web on Mar. 14, 2003.

Integrated Services, http://www.cl.cam.ac.uk/Teaching/2002/DigiComm2/int-serve-tech.pdf (41 pages) printed from the World Wide Web on Nov. 12, 2002.

U.S. Appl. No. 10/405,745, filed Apr. 2, 2003 in the name of Yarkosky et al.

Non-Final Office Action from U.S. Appl. No. 10/405,745, mailed May 28, 2008.

Final Office Action from U.S. Appl. No. 10/405,745, mailed Dec. 16, 2008.

Non-Final Office Action from U.S. Appl. No. 10/405,745, mailed May 3, 2006.

Advisory Action from U.S. Appl. No. 10/405,745, mailed Nov. 28, 2006.

Non-Final Office Action from U.S. Appl. No. 10/405,745, mailed Feb. 5, 2007.

Advisory Action from U.S. Appl. No. 10/405,745, mailed Dec. 27, 2007.

Non-Final Office Action mailed Jun. 9, 2011 for U.S. Appl. No. 12/201,634.

* cited by examiner

FIG. 1

| PROFILE ID | LATENCY SENSITIVITY |
|---|---|
| PROFILE_ID_1 | LATENCY-SENSITIVE |
| PROFILE_ID_2 | LATENCY-SENSITIVE |
| PROFILE_ID_3 | LATENCY-TOLERANT |
| PROFILE_ID_4 | LATENCY-TOLERANT |
| PROFILE_ID_5 | LATENCY-SENSITIVE |

CORRELATION DATA 200

PRIORITIZED EV-DO PAGING BASED ON TYPE OF PACKET FLOW

BACKGROUND

1. Technical Field

The present invention relates to wireless communications, and, more particularly, to management of wireless communications between Evolution Data Optimized (EV-DO) access nodes and EV-DO access terminals.

2. Description of Related Art

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid access terminals, can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a base station controller (BSC) in 1x networks. The access node also includes one or more base transceiver stations (BTSs) or "Node-Bs," each of which include one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, an access terminal may communicate over the packet-data network via the access node and the PDSN.

In addition to VoIP communication, access terminals frequently engage in other types of packet-data communication, such as instant messaging (IM) and web browsing. Each instance of an access terminal engaging in a type of packet-data communication for a period of time may be deemed a "packet flow," which would typically involve Internet Protocol (IP) packets being sent and received by the access terminal. For example, a given VoIP call may be referred to as a VoIP packet flow. Thus, as examples, an access terminal may engage in VoIP packet flows, IM packet flows, push-to-talk (PTT) packet flows, streaming-video packet flows, streaming-audio packet flows, video-telephony packet flows, and best-effort packet flows such as web-browsing packet flows and file-transfer-protocol (FTP) packet flows.

To address the fact that access terminals engage in these various types of packet flows, a particular revision of EV-DO specifications, known as EV-DO Rev. A ("EV-DO-A"), provides for what are known as profile IDs, which are identifiers associated on a one-to-one basis with types of packet flows. Thus, one profile ID may be associated with VoIP packet flows (i.e., "conversational voice"), while another may be associated with best-effort packet flows, and so on. Again, an access terminal may be able to communicate according to more than one profile ID, reflecting that it can engage in more than one type of packet flow.

Furthermore, to participate in one or more of these various types of packet flows, an access terminal may run (i.e., launch, enable, execute, etc.) particular communication applications, perhaps in response to receiving one or more user commands. As an example, to be able to participate in push-to-talk (PTT) packet flows, the access terminal may enable a PTT application. As another example, to be able to participate in IM packet flows, an access terminal may run an IM application. As yet another example, to be able to engage in web-browsing packet flows, an access terminal may launch a web browser.

To initiate connectivity, when powered on in a coverage area of an access node, an access terminal may send what is known as a Universal Access Terminal Identifier (UATI) request to the access node. The access node may respond by granting a UATI to the access terminal in a message known as a UATI response. This UATI response typically contains the granted UATI, which then serves to identify the access terminal to the access node for some period of time.

After acquiring a UATI, the access terminal will typically communicate with the access node over the air interface to set up what is referred to as a "session." Essentially, an access terminal that has a session with an access node can engage in packet-data communication over the packet-data network to which the access node and the PDSN provide access. Conversely, an access terminal that does not have a session with an access node can not engage in packet-data communication over the packet-data network.

As part of setting up the session, the access terminal sends a connection request to the access node, requesting an air-interface connection. The access node will responsively work to establish the air-interface connection with the access terminal, which involves the access node instructing the access terminal to communicate with the access node over what is known as a traffic channel. This traffic channel takes the form of particular timeslots on the forward link, during which the access node sends data to the access terminal, and a particular CDMA channel on the reverse link, over which the access terminal sends data to the access node.

In addition to establishing the connection with the access terminal, the access node takes a number of other actions, one of which is to validate that the access terminal is authorized to engage in packet-data communication via the access node. Another such action is to set up a radio-packet (e.g., A10/A11) connection between the access node and the PDSN on behalf of the access terminal. The access node also facilitates establishment of a data link (e.g., a point-to-point protocol (PPP) connection) between the access terminal and the PDSN. The access node may also facilitate assignment (e.g., by the PDSN or by a Mobile-IP home agent) of an IP address to the access terminal. Finally, the access terminal and the access node negotiate over the traffic channel to agree on a set of profile IDs for the access terminal to use during the session; in other words, they agree as to the types of packet flows in which the access terminal is capable of engaging and in which the access terminal is permitted to engage.

Once those steps are complete, the access terminal has a session with the access node, and can therefore communicate over the packet-data network via the access node and the PDSN, according to the agreed-upon set of profile IDs. The air-interface connection is then typically torn down, freeing up those resources for other access terminals. Both the network and the access terminal maintain data pertaining to the rest of what was established, however, including the IP address, radio-packet connection, and data link. This transition from having a traffic channel to not having one is referred to as the access terminal going from active to dormant.

Thereafter, if the access terminal wants to initiate communication, it will send another connection request to the access node, which will again assign a traffic channel to the access terminal. If, on the other hand, the access node receives data addressed to the access terminal (and the access terminal does not currently have an active traffic channel), the access node would typically send a page to the access terminal over a channel known as the control channel. Perhaps in that page, or in an ensuing message, the access node will assign a traffic channel to the access terminal. The access terminal can then engage in one or more packet flows of any of the negotiated types, over the packet-data network, using the traffic channel, as well as the previously-established IP address, radio-packet connection, and data link.

As part of setting up a packet flow, either the access terminal or the access node, or both, may send the other a message known as a ReservationOnRequest (RoR), which includes at least one profile ID, indicating the type of packet flow that is being requested. Once an RoR has been sent and acknowledged, the access terminal has an "open reservation" on the traffic channel, associated with the profile ID that was included in the RoR; in other words, the open reservation is associated with the type of packet flow in which the access terminal is then able to engage. An access terminal may have multiple open reservations on the traffic channel, corresponding to the fact that the access terminal can engage in multiple packet flows at one time.

The network typically uses this profile-ID information to apply a particular quality of service (QoS) to the packet flow, which essentially means providing a particular level of packet forwarding (or "expedited forwarding") treatment to certain packet flows. This traffic shaping is also known as "DiffServ" ("differentiated services"). Thus, a profile ID effectively represents a set of QoS characteristics to be applied to a packet flow.

SUMMARY

Methods and systems are provided for prioritized EV-DO paging based on type of packet flow. In one aspect of the present invention, an exemplary embodiment may take the form of a method, in accordance with which an access node provides service to a plurality of access terminals in a wireless coverage area. The access node receives data addressed to a first one of the access terminals. The data is associated with a packet flow. The access node determines that the first access terminal does not have an active traffic channel, and responsively generates a page for transmission to the first access terminal, where the generated page is associated with the packet flow. The access node determines whether the packet flow is latency-sensitive or rather is latency-tolerant. If the packet flow is latency-sensitive, the access node responsively prioritizes the generated page over one or more pages respectively associated with one or more latency-tolerant packet flows, with respect to order of transmission in the wireless coverage area.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Some types of packet flows conducted by access terminals are more latency-sensitive than others. That is, there are latency-sensitive packet flows, such as VoIP and PTT, and there are latency-tolerant packet flows, such as best-effort (e.g. web-browsing) packet flows. Thus, a service provider may classify certain types of packet flows as latency-sensitive, while classifying other types of packet flows as latency-tolerant. The service provider may further configure an access node (and perhaps specifically one or more RNCs) to store—or at least have access to—data that correlates different types of packet flows (e.g. different profile IDs) with either an indication of being latency-sensitive or and indication of being latency-tolerant. And packet flows could be more finely classified according to any number of levels of latency-sensitivity (and thus implicitly latency-tolerance), as two levels are used herein for illustration.

As such, when an access node receives data addressed to an access terminal that does not currently have an active traffic channel, the access node may generate a page to be sent to the access terminal, to initiate establishment of an air-interface connection (i.e. a traffic channel) between the access node and the access terminal. The access node may further examine the data and identify that it is associated with a particular profile ID. Based on that profile ID, the access terminal may determine whether the data is associated with a latency-sensitive packet flow or rather with a latency-tolerant packet flow. If the data is associated with a latency-sensitive packet flow, the access node may transmit the page to the access terminal with a high level of priority. If the data is associated with a latency-tolerant packet flow, the access node may transmit the page to the access terminal with a low level of priority.

As a result, on average, latency-sensitive packet flows will be set up more quickly than they otherwise would be. More particularly, on average, latency-sensitive packet flows will be set up more quickly than they are in existing EV-DO network implementations, which accord the same level of priority to all pages, regardless of the type of packet flow to which they pertain, and simply send all pages on a first-in-first-out (FIFO) basis. In general, it is desirable that setup times for latency-sensitive packet flows be minimized, to improve the user experience for, in the case of a VoIP call for example, at least the calling party. Calling parties, on average, will experience faster response times in reaching called parties.

With respect to carrying out prioritization of pages for latency-sensitive packet flows over pages for latency-tolerant packet flows, this could be accomplished many different ways. In general, an access node may have the ability to send out a given number of pages each time the access node transmits a standard amount of control-channel information on the control channel. In EV-DO, the access node transmits forward-link data in timeslots that last approximately 1.67 ms. Each sequence of 16 slots makes up what is known as a frame, which lasts approximately 26.67 ms. The control channel is typically transmitted on a series of either 8 or 16 slots once every 16 frames, or once every approximately 426.67 ms.

If 8 slots are used for the control channel, then each control-channel transmission would last approximately 13.33 ms. If 16 slots are used, however, then each control-channel transmission would last approximately 26.67 ms. Whether 8 or 16 slots are used depends on the bit rate that the access node uses to transmit the control channel. This control-channel bit rate can typically be set to either 38.4 kbps, in which case 16 slots are used, or 76.8 kbps, in which case 8 slots are used. Either way, the same standard amount of control-channel information is transmitted to access terminals on a given carrier in a given wireless coverage area, such as a sector, each time the access node transmits the control channel.

In this standard amount of control-channel information is a set number of pages that the access terminal can send out each time it transmits the control channel. In accordance with the present invention, with respect to this limited resource, the access node will give higher priority to pages related to latency-sensitive packet flows ("latency-sensitive pages") than it will to pages related to latency-tolerant packet flows ("latency-tolerant pages"). As stated, this giving of higher priority can be implemented in different ways.

In one embodiment, the access node may rank all latency-sensitive pages ahead of all latency-tolerant pages. This could be envisioned as two queues: a latency-sensitive-page queue and a latency-tolerant-page queue. This could also be envisioned as one queue, where latency-sensitive pages all come before latency-tolerant pages, and newly-arriving latency-sensitive pages are inserted into the queue at the end of the latency-sensitive-page sequence, ahead of all of the latency-tolerant pages. Either way, if the access node has enough latency-sensitive pages to fill the set number that it can send in a given control-channel transmission, then all of the pages in that control-channel transmission would be latency-sensitive pages, and no latency-tolerant pages would be sent until all of the latency-sensitive pages had been sent.

In another embodiment, more favorable consideration may be given to latency-tolerant pages, while still giving priority to latency-sensitive pages. In that embodiment, whether the two-queue model or the one-queue model is used as the conceptual and implementation model for organizing pages, the access node may, for each control-channel transmission, first select a certain number of pages from the front of the latency-sensitive-page queue, and then fill the remainder of page spots in that control-channel transmission with pages from the front of the latency-tolerant-page queue. And the ratio of latency-sensitive to latency-tolerant pages in each control-channel transmission could be adjusted to the degree of desired priority. As examples, that ratio could be 2:1, 3:1, or 10:1. In this embodiment, latency-tolerant packet flows would not be starved for paging, but would not receive the same priority as latency-sensitive packet flows.

Among the reasons for granting priority to latency-sensitive pages over latency-tolerant pages is that latency-sensitive pages may need to be prioritized for their associated packet flows to ever happen, while latency-tolerant pages are typically associated with packet flows that, even if the paging is delayed, will still happen, albeit perhaps at a worse level of user experience. For example, a VoIP call may never happen if the paging takes so long that the calling party decides not to wait. In contrast, for web-browsing, the access node may have a buffer where it stores the substantive data (HTML data) that it wants to deliver to the access terminal. If paging is delayed enough, that buffer may overflow and some of the earlier data to be stored therein may be lost. However, transmission protocols such as the Transmission Control Protocol (TCP) may remedy this through retransmission of non-acknowledged data. And no such safeguard may be in place for VoIP, PTT, streaming video, and other latency-sensitive packet flows.

2. Exemplary Architecture a. Exemplary Communication System

Figure 1:
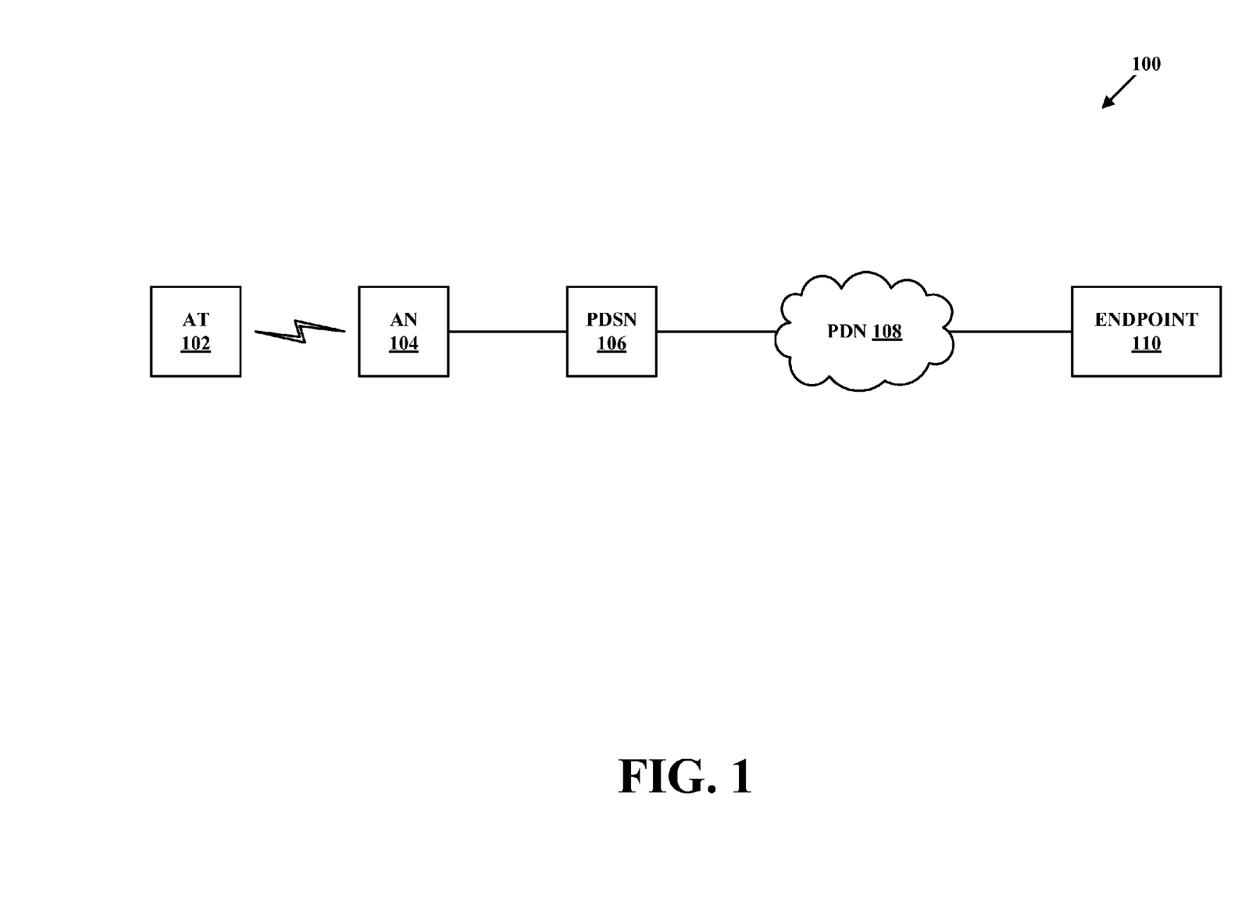
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node (AN) 104, a PDSN 106, a packet-data network (PDN) 108, and an end-point 110. Note that additional entities not depicted in FIG. 1 could be present as well. As an example, there could be more than one access terminal in communication with access node 104; furthermore, there could be additional entities in communication with PDN 108. Also, there could be one or more devices and/or networks making up at least part of one or more of the communication links depicted in FIG. 1. As an example, there could be one or more routers, switches, or other devices or networks on the link between PDSN 106 and PDN 108.

Access terminal 102 may be any mobile device arranged to carry out the access-terminal functions described herein. As such, access terminal 102 may include a user interface, a wireless-communication interface, a processor, and data storage comprising instructions executable by the processor for carrying out the access-terminal functions described herein. The user interface may include buttons, a touch-screen, a microphone, and/or any other elements for receiving inputs from users, as well as a speaker, one or more displays, and/or any other elements for communicating outputs to users.

The wireless-communication interface may comprise an antenna and a chipset for communicating with one or more access nodes over an air interface. As an example, the chipset could be one suitable for engaging in EV-DO (perhaps EV-DO-A) communications. The chipset or wireless-communication interface in general may also be able to communicate with a CDMA network, a Wi-Fi network, and/or one or more additional types of wireless networks. The processor and data storage may be any suitable components known to those of skill in the art. As examples, access terminal 102 could be or include a cell phone, a PDA, a computer, a laptop computer, a hybrid IS-2000/IS-856 device, and/or a multi-mode Wi-Fi/cellular device.

Access node 104 may be any one or any combination of network elements arranged to carry out the access-node functions described herein. As such, access node 104 may include a communication interface, a processor, and data storage comprising instructions executable by the processor to carry out the access-node functions described herein. The communication interface may include one or more antennas and chipsets or other components for providing one or more EV-DO coverage areas such as cells or sectors, for communicating with access terminals such as access terminal 102 over an air interface. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs).

Figure 2:
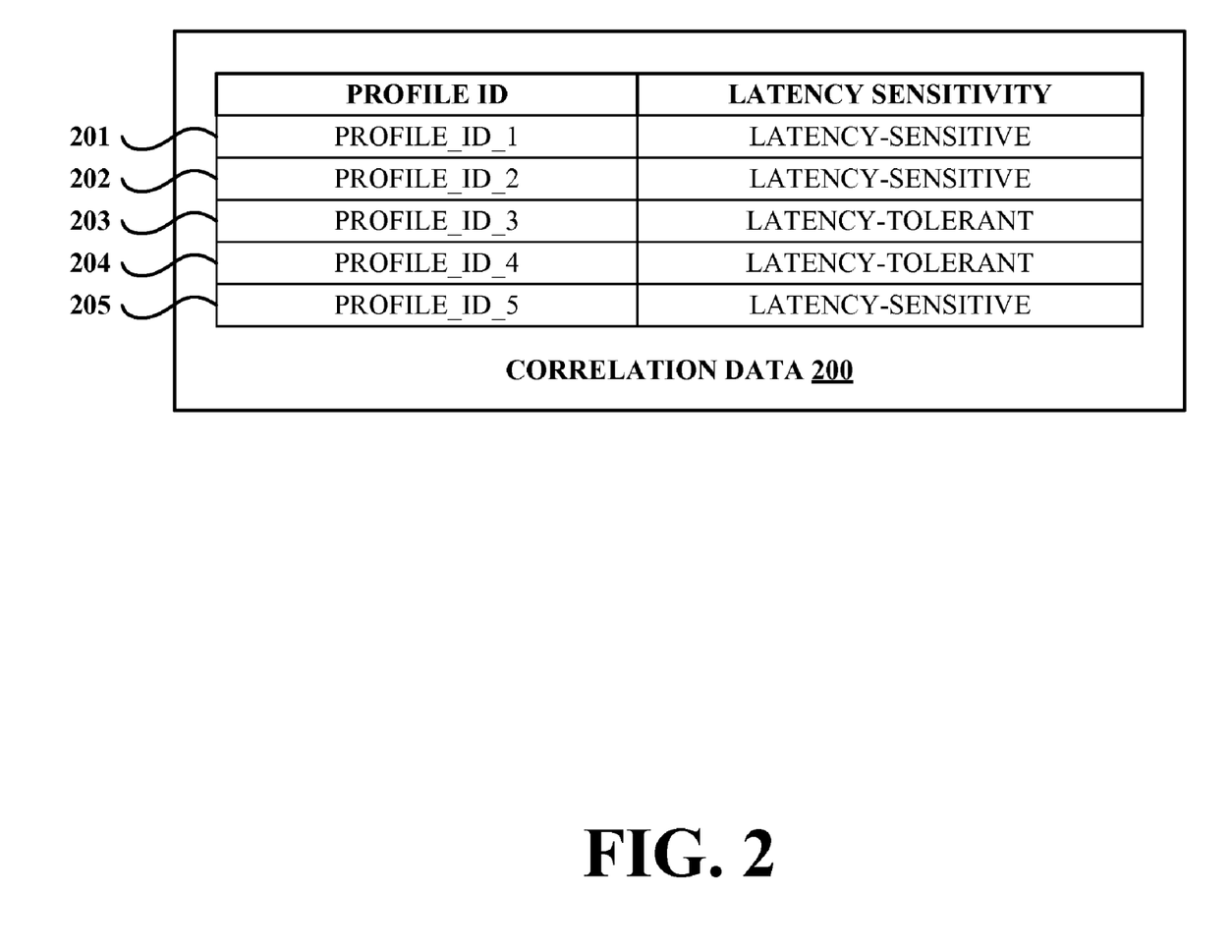
FIG. 2 is a simplified block diagram of correlation data, in accordance with exemplary embodiments.

Furthermore, access node 104 may store correlation data such as that depicted in FIG. 2, in which correlation data 200 is depicted as a table having five rows, 201-205. Each row correlates a respective profile ID with either an indication of being latency-sensitive or an indication of being latency-tolerant. Rows 201, 202, and 205 respectively depict profile IDs "PROFILE_ID_1," "PROFILE_ID_2," and "PROFILE_ID_5" correlated with an indication of being latency-sensitive. Rows 203 and 204 respectively depict profile IDs "PROFILE_ID_3" and "PROFILE_ID_4" correlated with an indication of being latency-tolerant. More or fewer correlations could be used, as five as used as an example. Also, a greater number of levels of latency-sensitivity could be used, as two is show as an example. And other ways of associating profile IDs or groups of profile IDs—or packet-flow-type indicia generally—with various levels of latency-sensitivity (and thus latency-tolerance) could be used as well.

Returning to FIG. 1, PDSN 106 may be any networking server or other device arranged to carry out the PDSN functions described herein. As such, PDSN 106 may include a communication interface, a processor, and data storage comprising instructions executable by the processor for carrying out the PDSN functions described herein. The communication interface may include a wired packet-data interface such as an Ethernet interface for communicating with access node 104 and over PDN 108. Note that PDSN 106 may, instead or in addition, comprise a wireless-communication interface for communicating with PDSN 106 and over PDN 108. Note as well that PDSN 106 may use the same interface or separate interfaces for communicating with access node 104 and for communicating over PDN 108.

PDN 108 may include one or more wide area networks, one or more local area networks, one or more public networks such as the Internet, one or more private networks, one or more wired networks, one or more wireless networks, and/or one or more networks of any other variety. Devices in communication with PDN 108 may exchange data using a packet-switched protocol such as IP, and may be identified by an address such as an IP address.

Endpoint 110 may be any device arranged to engage in one or more packet flows with access terminal 102 via PDN 108, PDSN 106, and access node 104, and to carry out the endpoint functions described herein. As such, endpoint 110 may include a communication interface, a processor, and data storage comprising instructions executable by the processor for carrying out the endpoint functions described herein. As examples, endpoint 110 could be or include a packet-based telephone, a computer, an access terminal, a cell phone, a PDA, a server (such as a call server, a VoIP server, a PTT server, a proxy (such as a Session Initiation Protocol (SIP) proxy))), and/or any other type of endpoint.

3. Exemplary Operation a. A First Exemplary Method

Figure 3:
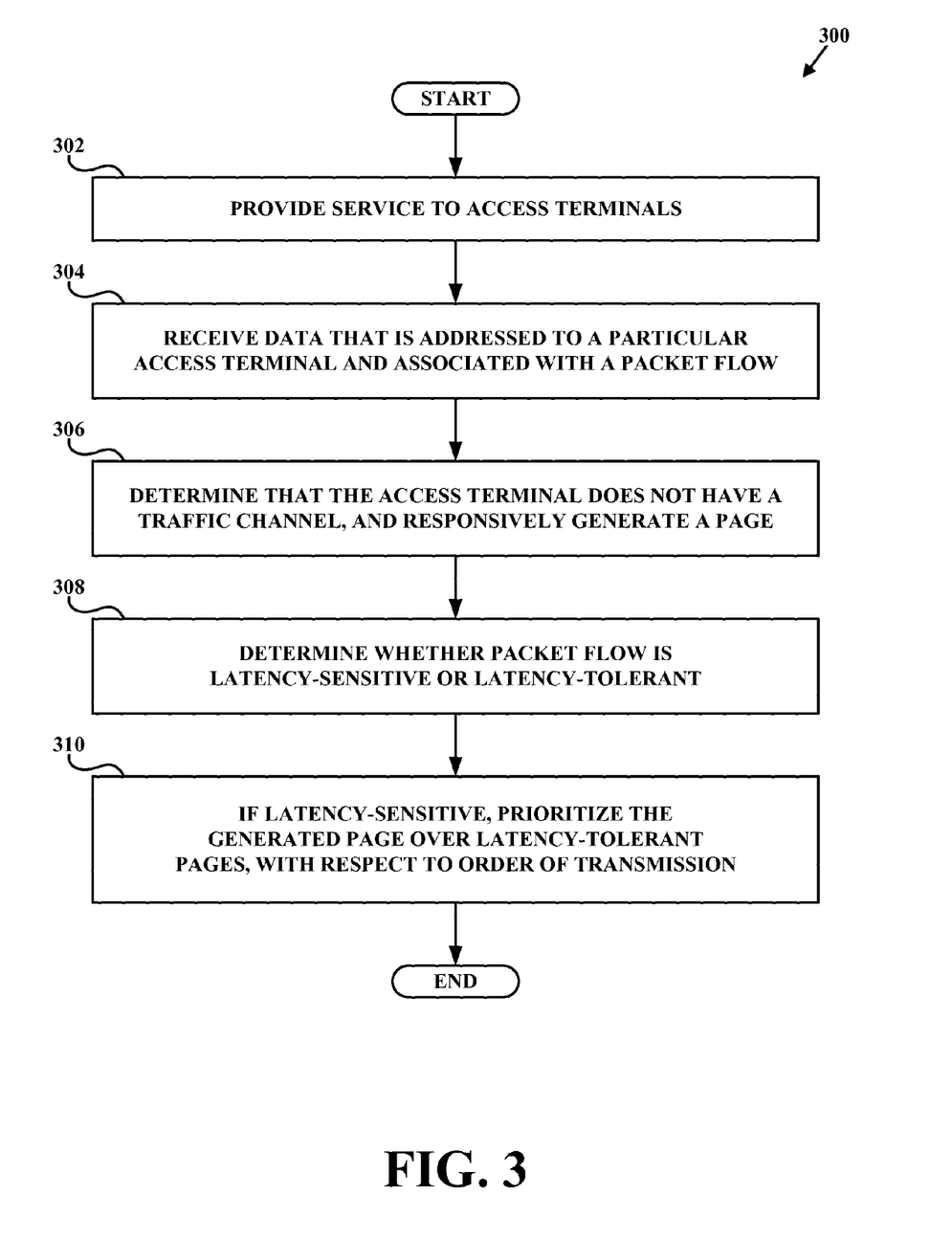
FIG. 3 is a flowchart of a method, in accordance with exemplary embodiments.

FIG. 3 depicts a flowchart of an exemplary method, in accordance with an exemplary embodiment. As shown in FIG. 3, method 300 begins at step 302, when access node 104 provides service to a plurality of access terminals, including access terminal 102, in a wireless coverage area. At step 304, access node 104 receives data addressed to access terminal 102, where the data is associated with a packet flow. At step 306, access node 104 determines that access terminal 102 does not have an active traffic channel, and responsively generates a page for transmission to access terminal 102, where the page is associated with the packet flow.

At step 308, access node 104 determines whether the packet flow is latency-sensitive or rather is latency-tolerant. At step 310, if the packet flow is latency-sensitive, access node 104 responsively prioritizes the page over one or more pages respectively associated with one or more latency-tolerant packet flows, with respect to order of transmission in the wireless coverage area. These steps are explained more fully in the following subsections.

And, although method 300 is described herein as being carried out by access node 104, this is not required. In some embodiments, method 300 may be carried out specifically by an RNC or BTS. In other embodiments, method 300 could be carried out by one or more servers, a gateway, a proxy, a BSC, a PDSN, any network element mentioned herein, some other network element, or perhaps some combination of these. And other possibilities exist as well.

i. Provide Service to Access Terminals

At step 302, access node 104 provides service to access terminals, such as access terminal 102, in a wireless coverage area. The service could be EV-DO service, perhaps in compliance with one or more industry standards such as IS-856, Rev. 0 and IS-856, Rev. A, both of which are incorporated herein by reference. Preferably, the service includes EV-DO-A service. Note that the wireless coverage area could be a cell or sector, as examples. Furthermore, the access terminals, including access terminal 102, could be or include EV-DO (and preferably EV-DO-A) access terminals.

ii. Receive Data for an Access Terminal

At step 304, access node 104 receives data addressed to access terminal 102. The data is associated with a particular packet flow. And the data may be addressed to access terminal 102 using one or more unique identifiers of access terminal 102, such as an IP address, a mobile identification number (MIN), a mobile equipment identifier (MEID), a media access control (MAC) address, a telephone number, and/or any other unique identifier. Recall that an access node and an access terminal typically, as part of the session-setup process, negotiate to establish a set of types of packet flows in which the access terminal is permitted and able to engage. In this example, the particular packet flow with which the received data is associated is a type that access terminal 102 and access node 104 agreed access terminal 102 could conduct.

iii. Determine that the Access Terminal Needs to be Paged

At step 306, access node 104 determines that access terminal 102 does not currently have an active traffic channel, and responsively generates a page for transmission to access terminal 102, where that generated page is associated with the particular packet flow with which the data received in step 304 is associated. This page may include information that alerts access terminal 102 that access node 104 has received data addressed to it, and may include an indication as to what type of packet flow the data is associated with. The generated page may also include data about a calling party if, for example, the packet flow is a VoIP or PTT call. Furthermore, the generated page may include a command or some other type of information that causes access terminal 102 to request a traffic channel for conducting the particular packet flow.

iv. Determine Whether Packet Flow is Latency-Sensitive or Latency-Tolerant

At step 308, access node 104 determines whether the particular packet flow—associated with the data received by access node 104 at step 304—is latency-sensitive or rather is latency-tolerant. As one example, access node 104 may carry out step 308 at least in part by examining the received data and identifying that the data includes an indication as to what type of packet flow the data is associated with. This indication could be a profile ID, or could be some other type of indication. Note that the packet-flow-type indication could be, but need not be, included in the data. That is, the access node may cross-reference some other identifier or identifiers in the received data to determine the packet-flow type.

Using the example of the received data including a packet-flow-type indication, and further of that indication being a profile ID, access node 104 may then reference correlation data such as correlation data 200, to ascertain whether that packet-flow type is associated with being latency-sensitive or latency tolerant. For example, if the profile ID is PROFILE_ID_1, access node 104 may reference row 201, and determine that the packet flow is latency-sensitive. As another example, if the profile ID is PROFILE_ID_3, access node 104 may reference row 203, and determine that the associated packet flow is latency-tolerant.

And the profile ID may indicate that the packet flow is of any particular type. As a non-exhaustive list of examples, the profile ID may indicate that the packet flow is a VoIP packet flow, a PTT packet flow, a high-performance push-to-talk (HPPTT) packet flow, a streaming-video packet flow, a streaming-audio packet flow, a video-telephony packet flow, a best-effort packet flow, a web-browsing packet flow, a file transfer protocol (FTP) packet flow, or some other type of packet flow. Of these, preferably, at a minimum, VoIP, PTT, HPPTT, streaming video, streaming-audio, and video-telephony packet flows would be categorized as latency-sensitive, while best-effort packet flows, including web-browsing and FTP packet flows, would be categorized as latency-tolerant.

v. If Latency-Sensitive, Prioritize the Page

At step 310, if the particular packet flow—associated with the data received by access node 104 at step 304, and with the page generated by access node 104 at step 306—is identified in step 308 as being latency-sensitive, access node 104 responsively prioritizes the generated page over one or more pages that are respectively associated with one or more latency-tolerant packet flows, with respect to order of transmission in the wireless coverage area. In one embodiment, access node 104 may maintain a latency-sensitive-page queue for latency-sensitive pages, and access node 104 may carry out step 310 at least in part by placing the generated page in the latency-sensitive-page queue.

Access node 104 may also maintain a latency-tolerant-page queue for latency-tolerant pages. In one embodiment, access node 104 may operate such that all pages in the latency-sensitive-page queue are transmitted in the wireless coverage area before any pages in the latency-tolerant-page queue are transmitted in the wireless coverage area. Thus, even if there were pages in the latency-tolerant page queue, access node 104 could operate such that it would not send any of those latency-tolerant pages until the latency-sensitive page queue was empty.

Note that access node 104 would typically transmit pages on the control channel, which is a channel that the access node periodically uses to transmit administrative data, such as pages, to access nodes. Each time access node 104 transmits the control channel, it has the capability to transmit at most a maximum number of pages. If the latency-sensitive-page queue had that many pages or more at a given instance when access node 104 was preparing the control-channel information for transmission in the wireless coverage area, then, under the complete-priority scheme described just above, all of the pages in that instance of transmitting the control channel would be for latency-sensitive packet flows, and the latency-tolerant page queue would be starved until the next instance of control-channel transmission, or maybe even a later one.

That is certainly one way that the present invention could be implemented. Another way would be to transmit some pages from the latency-sensitive-page queue and some pages from the latency-tolerant-page queue each time, assuming that each queue had some pages ready to go. And access node 104 would still prioritize latency-sensitive pages over latency-tolerant pages by choosing a ratio of latency-sensitive pages to latency-tolerant pages for each instance of sending out pages on the control channel, where the latency-sensitive pages outnumber the latency-tolerant pages. This ratio could be set to 2:1, 5:1, 10:1, or to any other value.

Thus, if the ratio were 2:1 and the maximum number of pages that could be transmitted in a given instance of transmitting the control channel was 15, then 10 pages could be selected from the latency-sensitive-page queue and 5 pages could be selected from the latency-tolerant page queue. Thus, the latency-sensitive-page queue would move more quickly, but the latency-tolerant-page queue would not be starved. The 15 selected pages could then be transmitted in the coverage area. And a page-selection scheme such as FIFO could be implemented with respect to selecting pages from each queue, though other schemes could be used as well.

b. A Second Exemplary Method

Figure 4:
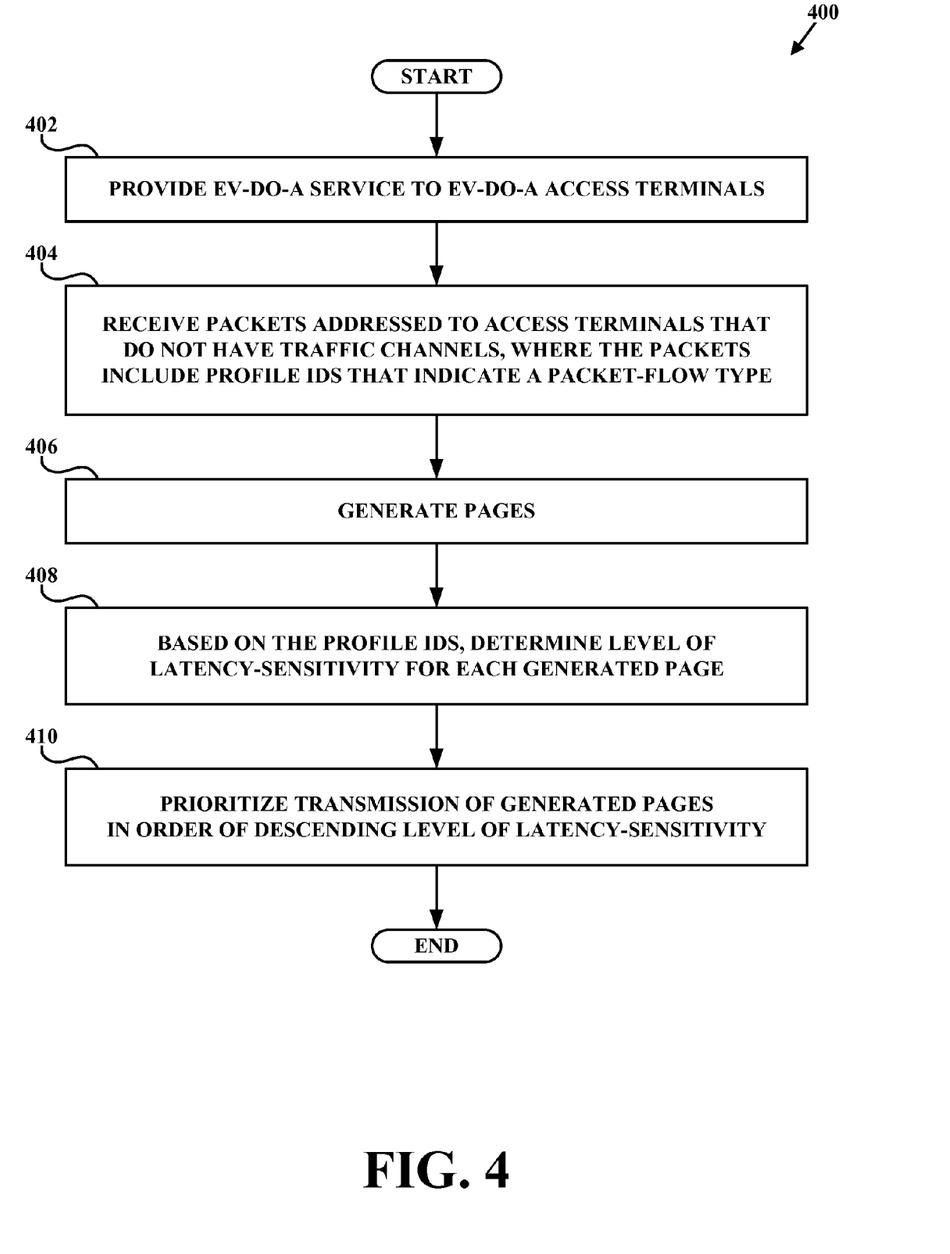
FIG. 4 is a flowchart of a method, in accordance with exemplary embodiments.

FIG. 4 is a flowchart of an exemplary method, in accordance with an exemplary embodiment. As with method 300 of FIG. 3, method 400 of FIG. 4 is described as being carried out by an access node, and by access node 104 of FIG. 1 in particular, though this is not required. Method 400 could be carried out by any one or any combination of the entities described as possibilities for method 300, and/or any other entity or entities. Method 400 is similar in some respects to method 300, and thus is not described in as great of detail.

As shown in FIG. 4, a method 400 begins at step 402, when access node 104 provides EV-DO-A service to EV-DO-A access terminals in a wireless coverage area, such as a cell or a sector. At step 404, access node 104 receives packets addressed to particular access terminals that do not, at the time that access node 104 receives the packets, have active traffic channels. The packets respectively comprise particular profile IDs that indicate a type of packet flow with which they are associated.

At step 406, responsive to receiving the packets at step 404, access node 104 generates pages for transmission to the respective access terminals. At step 408, based on the profile IDs in the received packets, access node 104 determines a level of latency-sensitivity for each of the generated pages, among multiple possible levels of latency-sensitivity. At step 410, access node 104 prioritizes transmission of the generated pages in the wireless coverage area in order of descending level of latency-sensitivity.

Note that method 400 is generalized to contemplate any number of levels of latency-sensitivity (as compared with the two levels (latency-sensitive and latency-tolerant) of method 300. Again, the prioritization of step 410 could be carried out in different ways. For example, access node 104 may maintain a queue at each level, and then step through them in descending order of latency-sensitivity. Within each level, access node 104 may implement a page selection scheme such as FIFO.

In one embodiment, access node 104 may insist on emptying the queue at each level before moving on to the next level, no matter how many instances of transmitting pages on the control channel it requires. In another embodiment, access node 104 may operate according to a ratio approach, whereby access node 104 selects a given number of pages from each level, where the greatest number are selected from the most latency-sensitive level, the next greatest number from the next most latency-sensitive level, and so on. And other examples are possible as well.

4. Conclusion

Various exemplary embodiments have been described above. Those skilled in the art will understand, however, that changes and modifications may be made to those examples without departing from the scope of the claims.

What is claimed is:

1. A method comprising:
   providing service to a plurality of access terminals in a wireless coverage area;
   receiving data addressed to a first one of the access terminals, the data being associated with a first packet flow;
   determining that the first access terminal does not have an active traffic channel, and responsively generating a first page for transmission to the first access terminal, the first page being associated with the first packet flow;
   determining whether the first packet flow is latency-sensitive or rather is latency-tolerant; and
   if the first packet flow is latency-sensitive, responsively prioritizing the first page over one or more pages respectively associated with one or more latency-tolerant packet flows, the prioritizing being with respect to order of transmission in the wireless coverage area, the method further comprising:
      maintaining a latency-sensitive-page queue for latency-sensitive pages, wherein prioritizing the first page over one or more pages respectively associated with one or more latency-tolerant packet flows comprises placing the first page in the latency-sensitive-page queue;
      maintaining a latency-tolerant-page queue for latency-tolerant pages;
      periodically transmitting a control channel in the wireless coverage area;
      operating such that a maximum number of pages can be transmitted in the wireless coverage area each time the control channel is transmitted; and
      each time the control channel is transmitted, selecting up to a first number of pages from the latency-sensitive-page queue, and selecting up to a second number of pages from the latency-tolerant-page queue, wherein the first number is greater than the second number, wherein the first number plus the second number is less than or equal to the maximum number, and transmitting the pages selected from both queues on the control channel.

2. The method of claim 1, wherein the service comprises Evolution Data Optimized (EV-DO) service, wherein the access terminals comprise EV-DO access terminals, and wherein the method is carried out by at least one of an EV-DO radio network controller, and EV-DO base transceiver station, and an EV-DO access node.

3. The method of claim 1, wherein the wireless coverage area is a cell or a sector.

4. The method of claim 1, wherein the first access terminal is a device selected from the group consisting of a cell phone, a personal digital assistant, a computer, a laptop computer, a hybrid IS-2000/IS-856 device, and a multi-mode Wi-Fi/cellular device.

5. The method of claim 1, wherein the data is addressed to at least one identifier of the first access terminal, wherein the at least one identifier includes at least one of an Internet Protocol (IP) address, a mobile identification number (MIN), a mobile equipment identifier (MEID), a media access control (MAC) address, and a telephone number.

6. The method of claim 1, further comprising negotiating with the first access terminal to establish that the first access terminal is capable of engaging in the first packet flow and that the first access terminal is permitted to engage in the first packet flow.

7. The method of claim 1, wherein the first page comprises information to alert the first access terminal as to the receipt of the data, and further comprises information to cause the access terminal to request a traffic channel for conducting the first packet flow.

8. The method of claim 1, wherein determining whether the first packet flow is latency-sensitive or rather is latency-tolerant comprises referencing correlation data that correlates each of a plurality of packet-flow types with an indication of being latency-sensitive or rather with an indication of being latency-tolerant.

9. The method of claim 1, wherein the data comprises a first packet-flow-type indication, and wherein determining whether the first packet flow is latency-sensitive or rather is latency-tolerant comprises determining whether the first packet-flow-type indication is associated with latency-sensitivity or rather with latency-tolerance.

10. The method of claim 9 wherein the first packet-flow-type indication is a profile ID.

11. The method of claim 9, wherein the first packet-flow-type indication indicates that the packet flow is of a type selected from the group consisting of a Voice over Internet Protocol (VoIP) packet flow, a push-to-talk (PTT) packet flow, a high-performance push-to-talk (HPPTT) packet flow, a streaming-video packet flow, a streaming-audio packet flow, a video-telephony packet flow, a best-effort packet flow, a web-browsing packet flow, and a file transfer protocol (FTP) packet flow.

12. An access node comprising:
   a communication interface;
   a processor; and
   data storage comprising instructions executable by the processor to:

provide service to a plurality of access terminals in a wireless coverage area;

receive data addressed to a first one of the access terminals, the data being associated with a first packet flow;

determine that the first access terminal does not have an active traffic channel, and responsively generate a first page for transmission to the first access terminal, the first page being associated with the first packet flow;

determine whether the first packet flow is latency-sensitive or rather is latency-tolerant; and if the first packet flow is latency-sensitive, responsively prioritize the first page over one or more pages respectively associated with one or more latency-tolerant packet flows, the prioritizing being with respect to order of transmission in the wireless coverage area, and further to:

maintain a latency-sensitive-page queue for latency-sensitive pages, wherein prioritizing the first page over one or more pages respectively associated with one or more latency-tolerant packet flows comprises placing the first page in the latency-sensitive-page queue;

maintain a latency-tolerant-page queue for latency-tolerant pages;

periodically transmit a control channel in the wireless coverage area;

operate such that a maximum number of pages can be transmitted in the wireless coverage area each time the control channel is transmitted; and each time the control channel is transmitted, select up to a first number of pages from the latency-sensitive-page queue, and select up to a second number of pages from the latency-tolerant-page queue, wherein the first number is greater than the second number, wherein the first number plus the second number is less than or equal to the maximum number, and transmit the pages selected from both queues on the control channel.

\* \* \* \* \*